United States Patent

Narukawa et al.

[11] Patent Number: 5,659,669
[45] Date of Patent: Aug. 19, 1997

[54] HOST BASED PRINTER AND A PRINT CONTROL METHOD OF THE SAME

[75] Inventors: Toshiki Narukawa, Kasugai; Norimichi Funahashi, Nisshin; Hajime Usami, Nagoya, all of Japan

[73] Assignee: Brother Kogyo Kabushiki Kaisha, Nagoya, Japan

[21] Appl. No.: 672,033

[22] Filed: Jun. 26, 1996

[30] Foreign Application Priority Data

Jun. 26, 1995  [JP]  Japan .................................. 7-183535

[51] Int. Cl.⁶ .................................................. G06K 15/00
[52] U.S. Cl. .................................... 395/102; 395/115
[58] Field of Search .................................... 395/102, 112, 395/114, 115, 116, 834, 872, 876, 877, 497.01, 497.02, 497.03, 497.04; 358/426, 261.4, 444, 404, 524, 451

[56] References Cited

U.S. PATENT DOCUMENTS 4,841,375  6/1989  Nakajima et al. ..
5,206,741  4/1993  Shimura et al. .................... 358/404
5,337,258  8/1994  Dennis ................................. 395/575

FOREIGN PATENT DOCUMENTS 62-279951  12/1987  Japan .
62-279952  12/1987  Japan .
62-279953  12/1987  Japan .

*Primary Examiner*—Arthur G. Evans
*Attorney, Agent, or Firm*—Oliff & Berridge

[57] ABSTRACT

A host based printer has a control unit on which an external RAM can be optionally mounted. Whether or not the external RAM is mounted thereon is determined. When affirmative, image data received from a host computer is temporarily stored in the external RAM serving as a reception buffer. The image data retrieved from the reception buffer is sent to a decoding circuit to produce dot image data which in turn is sent to a line buffer for printing. When the external RAM is not mounted, the print control is implemented with a bufferless configuration in which the received image data is directly sent to the decoding circuit and the decoded data is sent to the line buffer for printing. Accordingly, the host based printer can operate with a buffer-less configuration while preserving operability of general host based printers.

11 Claims, 7 Drawing Sheets

HOST BASED PRINTER AND A PRINT CONTROL METHOD OF THE SAME

BACKGROUND OF THE INVENTION

1. Field of the Invention

The present invention relates to a host based printer which receives compressed image data from a host computer and prints images based thereon, and more particularly to such a printer in which a reception buffer can be omitted and a line buffer is effectively used.

2. Description of the Related Art

Generally, printers receive code data from an external equipment and convert the code data to image data for printing. Because of a time needed for data conversion, there is a limit in increasing printing speed. Recently, host based printers have been extensively used. High performance personal computers are used as host computers which produce compressed dot image data and send the same to the host based printer.

The host based printer includes at least a transmission/reception circuit, a reception buffer, a DMA (direct memory access) controller, a decoding circuit, a line buffer, and a print controller. The transmission/reception circuit transmits data to the host computer and receives data therefrom. The reception buffer temporarily stores parallel compressed dot image data received from the host computer. The DMA controller, connected to both the transmission/reception circuit and the reception buffer, directly accesses the reception buffer to send the compressed dot image data stored therein to the decoding circuit. The decoding circuit decodes the compressed dot image data to reproduce the dot image data. The line buffer temporarily stores one raster line worth of dot image data and outputs serial data for supplying to a print driver. The host based printer is capable of performing a high speed decoding of the compressed dot image data to such an extent that the received compressed dot image data can be almost simultaneously printed. For such host based printers, a large capacity reception buffer is not required but a small capacity reception buffer suffices. However, the reception buffer is requisite and cannot be dispensed with.

Many printers have a resolution selection capability. For example, either a 600 dpi or a 300 dpi printing resolution can be selected. The line buffer has a storage area for storing one raster line worth of dot image data in a high resolution mode. For example, when the resolution is 600 dip, dot image data per one raster line is about 640 byte, and when the resolution is 300 dpi, dot image data per one raster line is about 320 byte.

The conventional host based printer makes use of only a part of the storage area in the line buffer and the rest of the storage area therein remain unused when the printer is changed to a low resolution mode. Therefore, the use of the line buffer is not effective.

SUMMARY OF THE INVENTION

In view of the foregoing, the present invention has been made to solve the aforementioned problems accompanying the conventional host based printers. Accordingly, it is an object of the present invention to provide a print control method of a host based printer in which a reception buffer can be dispensed with.

Another object of the present invention is to provide a print control method in which a part of a storage area in a line buffer can be used as a reception buffer when a low print resolution is selected.

The above and other objects of the present invention can be achieved by a method of controlling a host based printer for use in combination with a host computer in which the host computer transmits compressed image data to the host based printer. In the method, it is determined whether or not a reception buffer is provided in the host based printer (step a). When the determination made in step a indicates that the reception buffer is provided in the host based printer, the compressed image data is received at the reception buffer, the compressed image data is retrieved from the reception buffer, the compressed image data retrieved from the reception buffer is decoded in a decoding circuit to provide dot image data, the dot image data is stored in a line buffer, and the dot image data from the line buffer is retrieved for printing (step b). When the determination made in step a indicates that the reception buffer is not provided in the host based printer, the compressed image data is directly received at the decoding circuit, the compressed image data is decoded in the decoding circuit to provide the dot image data, the dot image data is stored in the line buffer, and the dot image data from the line buffer is retrieved for printing (step c).

In step b, it is determined whether or not the compressed image data received from the reception buffer contains a page end code representing an end of the compressed image data on each page (step b1). When the determination made in step b1 indicates that the compressed image data contains the page end code, printing of the compressed image data stored in the reception buffer is started, if printing has not yet been started. If printing has already been started, a printed sheet of paper is discharged and a fresh sheet of paper is fed to a print position upon printing the compressed image data having been stored in the reception buffer before receipt of the page end code (step b2). When the determination made in step b1 indicates that the page end code is not received in the reception buffer, an in-advance print is instructed to start wherein printing is started when the reception buffer has become full with the compressed image data before receiving the page end code (step b3).

In step b2, it is further determined whether or not the reception buffer is full with the compressed image (step b21). When the determination made in step b21 indicates that the reception buffer is full, the host computer is instructed to stop transmitting the compressed image data (step b22). The determination in step b21 is repeated (step b23). Then, when the determination made in step b23 indicates that the reception buffer is no longer full, it is determined whether or not more than a predetermined amount of storage area in the reception buffer is available (step b24). When the determination made in step (b24) indicates that the predetermined amount of storage area in the reception buffer is available, the host computer is instructed to resume transmission of the compressed image data (step b25).

In step b3, the compressed image data is retrieved from the reception buffer (step b31). The compressed image data retrieved in step b31 is decoded to provide dot image data (step b32). The dot image data is stored in the line buffer (step b33). Then, it is determined whether or not the reception buffer is full with the compressed image (step b34). When the determination made in step b34 indicates that the reception buffer is full, the host computer is instructed to stop transmitting the compressed image data (step b35). Then, it is determined whether or not the reception buffer stores the page end code (step b36). When the determination made in step b36 indicates that the reception buffer does not store the page end code, printing of the dot image data stored in the line buffer is started (step b37). It is further determined whether or not more than a predetermined amount of storage area in the reception buffer is available (step b38). When the determination made in step b38 indicates that the predetermined amount of storage area in the reception buffer is available, the host computer is instructed to resume transmission of the compressed image data (step b39).

In step c, it is determined whether or not the compressed image data received from the host computer contains a page end code representing an end of the compressed image data on each page (step c1). When the determination made in step c1 indicates that the compressed image data does not contain the page end code, the compressed image data is directly received at the decoding circuit (step c2). The compressed image data is decoded and dot image data is provided (step c3). The dot image data is stored in the line buffer (step c4). When the determination made in step c1 indicates that the compressed image data contains the page end code, the compressed image data is directly received at the decoding circuit (step c5). Printing of the dot image data stored in the line buffer is started, if printing has not yet been started (step c6). A printed sheet of paper is discharged and a fresh sheet of paper is fed to a print position upon printing the dot image data having been stored in the line buffer before receiving the page end code, if printing has already been started (step c7).

It is further determined whether or not the line buffer is full with the dot image data (step c8). When the determination made in step c8 indicates that the line buffer is full, the host computer is instructed to stop transmitting the compressed image data (step c9). Then, the dot image data stored in the line buffer is printed (step c10). It is determined whether or not more than a predetermined amount of storage area in the line buffer is available (step c11). When the determination made in step c11 indicates that the predetermined amount of storage area in the line buffer is available, the host computer is instructed to resume transmission of the compressed image data.

In another aspect of the present invention, there is provided a host based printer for use in combination with a host computer, on which a reception buffer is optionally mounted. The reception buffer, when mounted, receives compressed image data from the host computer. There are provided a decoding circuit, a line buffer, a printing means, and print control means. The decoding circuit decodes the compressed image data retrieved from the reception buffer and provides dot image data. The line buffer has a storage area for storing the dot image data and outputs the dot image data. The printing means prints dot images on a sheet of paper in accordance with the dot image data output from the line buffer. The dot images has a resolution defined by a printable dot number per a unit length. A resolution selecting means is further provided for selecting one from at least a first resolution and a second resolution lower than the first resolution. The print control means controls the print means to print the dot images with either the first resolution or the second resolution selected by the resolution selecting means. A buffer switching means is provided for switching a part of the storage area of the line buffer to an extended storage area of the reception buffer when the resolution selecting means selects the second resolution.

When the reception buffer is not mounted on the printer, the compressed image data is directly received at the decoding circuit. In this case, switching means is provided for switching a compressed image data receiving location from the decoding means to the line buffer when the resolution selecting means selects the second resolution wherein a part of the storage area of the line buffer is used as a storage area for receiving the compressed image data.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

Preferred embodiments of the present invention will be described with reference to the accompanying drawings.

Figure 1:
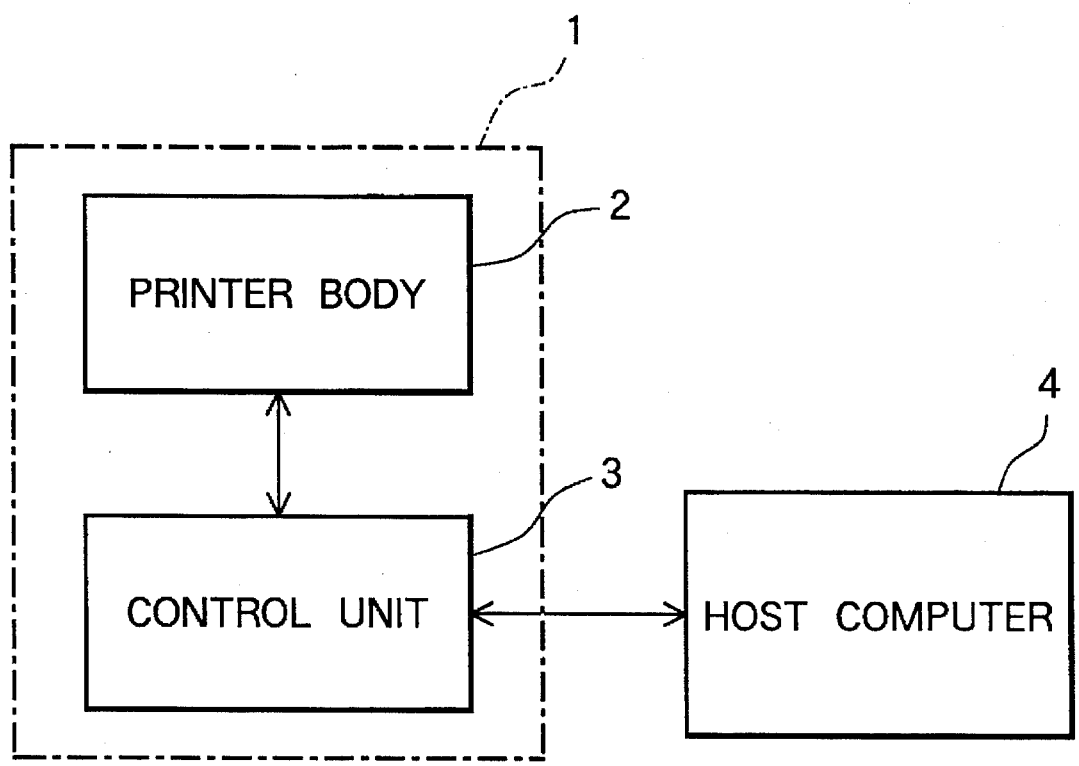
FIG. 1 is a block diagram showing a host based printer connected to a host computer according to an embodiment of the present invention.

As shown in FIG. 1, a host based printer 1 is connected via a parallel data cable to a personal computer serving as a host computer 4. The host based printer 1 receives image data in the form of compressed dot image from the host computer 4. The hardware arrangement of the host based printer 1 is similar to that of a conventional laser beam printer, so detailed description thereof is unnecessary. Briefly, the printer 1 is composed of a printer body 2 and a control unit 3. The printer body 2 includes a printing mechanism having a laser beam scanning unit, a paper feed mechanism, and so on. The control unit 3 controls such mechanisms included in the printer body 2.

Figure 2:
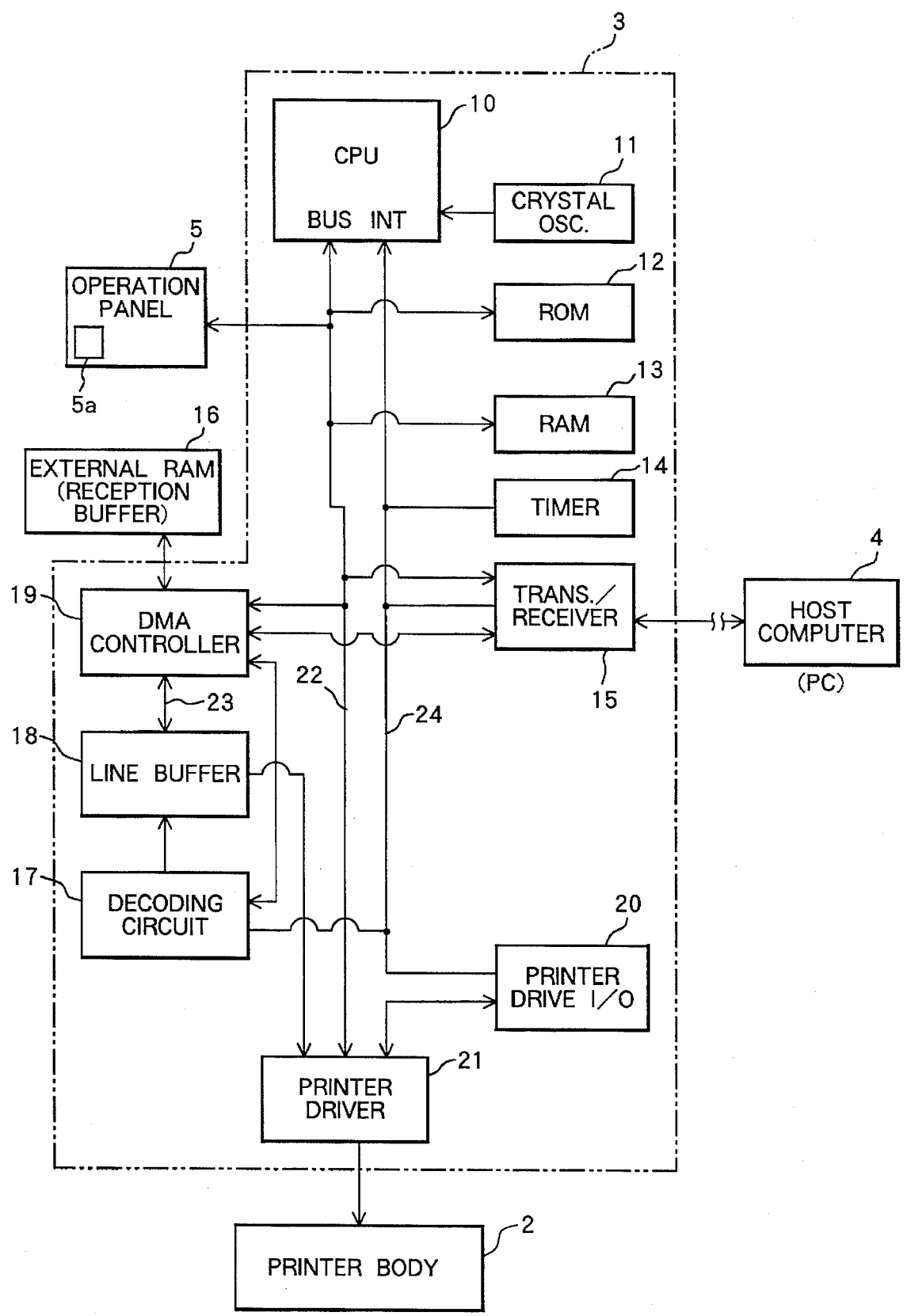
FIG. 2 is a block diagram showing a control unit of the host based printer according to the embodiment of the present invention.

As shown in FIG. 2, the control unit 3 includes an 8-bit CPU 10, a crystal oscillator 11, a ROM 12, and a RAM 13. The crystal oscillator 11 is connected to the CPU 10 and supplies 12.27 MHz clock pulses thereto. The ROM 12 stores various programs including a print control program and a buffer change-over control program. The RAM 13 has storage locations used as various work memories. The control unit 3 further includes a timer 14, a transmitter/receiver 15, an external RAM 16, a decoding circuit 17, a line buffer 18, a DMA controller 19, a printer drive I/O 20, and a printer driver 21. The timer 14 is connected to the CPU 10 and used for executing time base interruption. The transmitter/receiver 15 carries out data communication between the control unit 3 and the host computer 4. The external RAM 16 is optionally mounted on the control unit 3 and used as a reception buffer for temporarily storing the image data received from the host computer 4. Hereinafter the external RAM 16 will be referred to as "reception buffer 16". The decoding circuit 17 receives the image data from the reception buffer 16 and decodes the same. The line buffer 18 receives the decoded image data from the decoding circuit 17, temporarily stores the same, and serially outputs dot image data. The DMA controller 19 directly accesses the reception buffer 16 and the line buffer 18. An operation panel 5 is connected to the control unit 3 and is provided with a resolution setting switch 5a for setting a resolution of an image to be printed by the printer 1.

The ROM 12, RAM 13, transmitter/receiver 15, DMA controller 19 and printer driver 21 are connected to the CPU 10 via bus 22. The timer 14, transmitter/receiver 15, printer drive I/O 20, and decoding circuit 17 are connected to the CPU 10 via an interruption signal line 24. The DMA controller 19 is connected to the reception buffer 16, the line buffer 18, and the decoding circuit 17.

Parallel compressed image data from the host computer 4 is received at the transmitter/receiver 15 and temporarily stored in the reception buffer 16 under the aegis of the DMA controller 19. The image data is then retrieved from the reception buffer 16 and supplied to the decoding circuit 17 under the aegis of the DMA controller 19. In the decoding circuit 17, the compressed image data is decoded and the resultant image data representing dot images is supplied to the line buffer 18. The line buffer 18 in turn supplies the image data in the form of serial data to the printer driver 21. The printer driver 21 drives the print mechanism in accordance with a drive signal corresponding to the dot images represented by the image data. The data compression performed by the host computer 4 is basically the same as the MODE 9 proposed by Hewlett-Packard. The decoding circuit 17 is in the form of ASIC (application specified integrated circuit) including an interpreter for decoding the MODE 9 compressed image data and provide the image data representing dot images.

The resolution of the image to be printed by the printing mechanism can be changed to either 600 dpi (dots per inch) or 300 dpi. The change of the resolution can be achieved by an image-resolution conversion technology as disclosed, for example, in U.S. Pat. No. 4,841,375 to Nakajima et al. The reception buffer 16 is a ring buffer consisting of a plurality of blocks. The storage capacity of the reception buffer 16 is 0.5 MB but can be extended up to 4.0 MB. The number of blocks, leading and trailing addresses of each block, and the overall capacity of the reception buffer 16 are detected through a RAM check procedure. Information thus detected is stored in the address register of the RAM 13.

The DMA controller 19 is capable of directly accessing the reception buffer with a write block pointer for designating a block to be written, a read block point for designating a block to be read, a write pointer for designating a write address, a read pointer for designating a read address, and a control unit for controlling the DMA-controller 19. The line buffer 18 has a 640 byte storage capacity capable of storing one raster (one dot line) worth of image data supplied when the resolution is 600 dpi. As will be described later, when the resolution is set to 300 dpi, a half of the capacity of the line buffer 18, i.e., 320 byte, is used as the reception buffer. In this case, the DMA controller 19 accesses the region of line buffer 18 acting as the reception buffer.

The buffer change-over control according to the present invention will next be described. The buffer change-over control is accompanied by the print control for controlling various mechanisms included in the printer body 2.

Because the host based printer 1 receives image data in the form of compressed dot image from the host computer 4, it is capable of performing a high speed printing as compared with other types of printers. The host based printer 1 is set to either an in-advance print mode when the external RAM 16 is optionally mounted on the control unit 3 or a buffer-less print mode when the external RAM 16 is not mounted thereon.

The in-advance print mode is a print mode in which the printer driver 21 is operated when a page end code PEC representative of the end of the image data on a first page is received before start of printing, and also when the reception buffer 16 becomes full before receipt of the page end code PEC. After start of printing in the in-advance print mode, a paper feed operation, i.e., discharge of printed sheet and supply of a fresh sheet, is performed by way of an interruption process each time when the page end code PEC is received. When the reception buffer 16 becomes full, printing is not interrupted but the host computer 4 is instructed to temporarily stop transmission of the image data. When more than a predetermined amount (e.g. 1 kilo byte) of an empty area becomes available in the reception buffer 16 after interruption of the image data transmission, the host computer 4 is instructed to resume transmission of the image data. In this manner, occurrences of print overrun error and/or data communication error are prevented.

The buffer-less print mode is a print mode in which printing is carried out without using the reception buffer. In this mode, the image data received from the host computer 4 is directed applied to the decoding circuit 17, and the decoded dot image is stored in the line buffer 18 and then supplied to the printer driver 21 for printing.

The buffer change-over control will be described while referring to the flowcharts shown in FIGS. 3 to 5. In the following description, Si (i=1, 2, . . . ) indicates step numbers.

Figure 3:
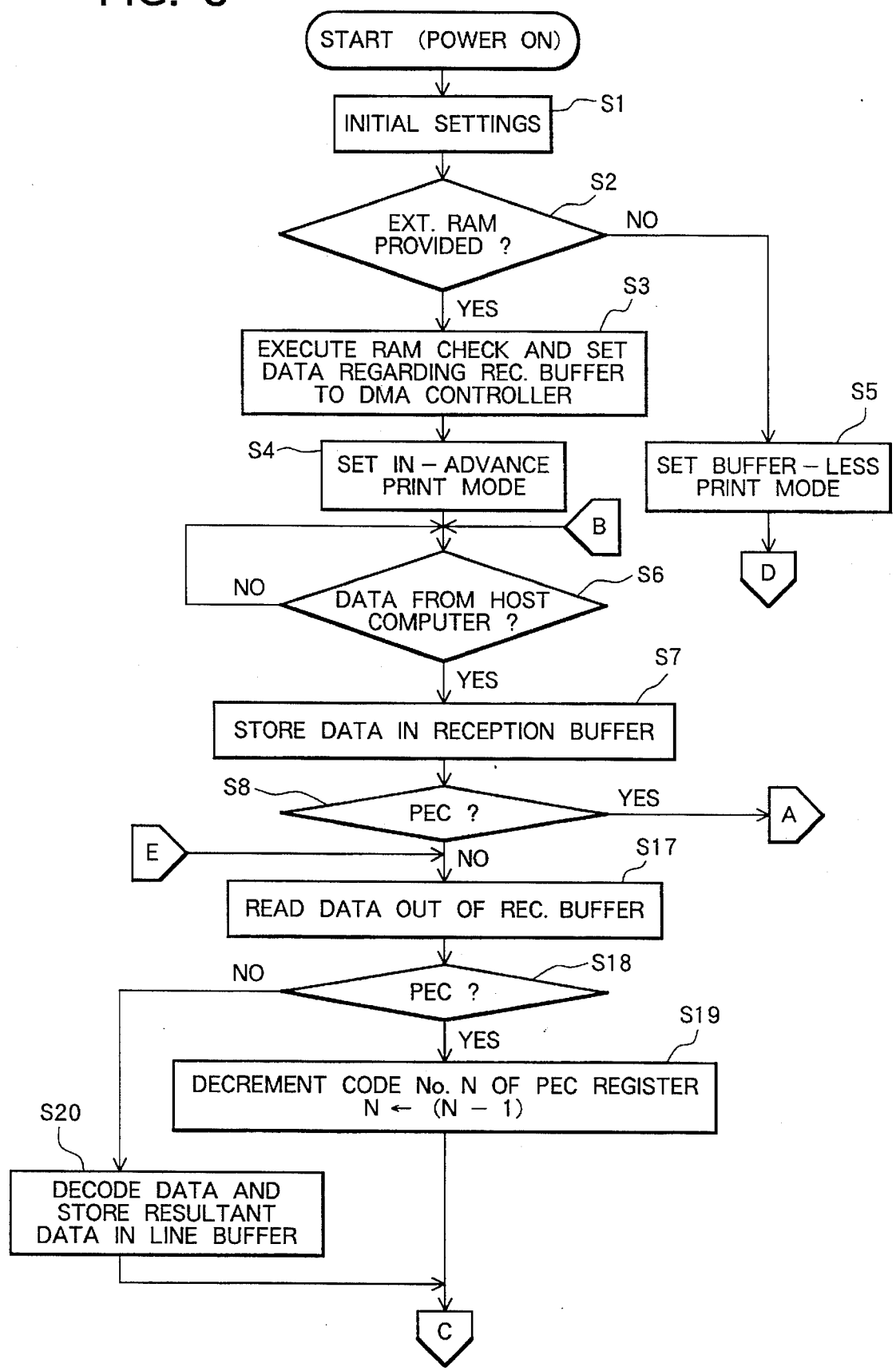
FIG. 3 is a first part of flowchart illustrating a program of a buffer change-over monitor control according to the embodiment of the present invention.
Figure 4:
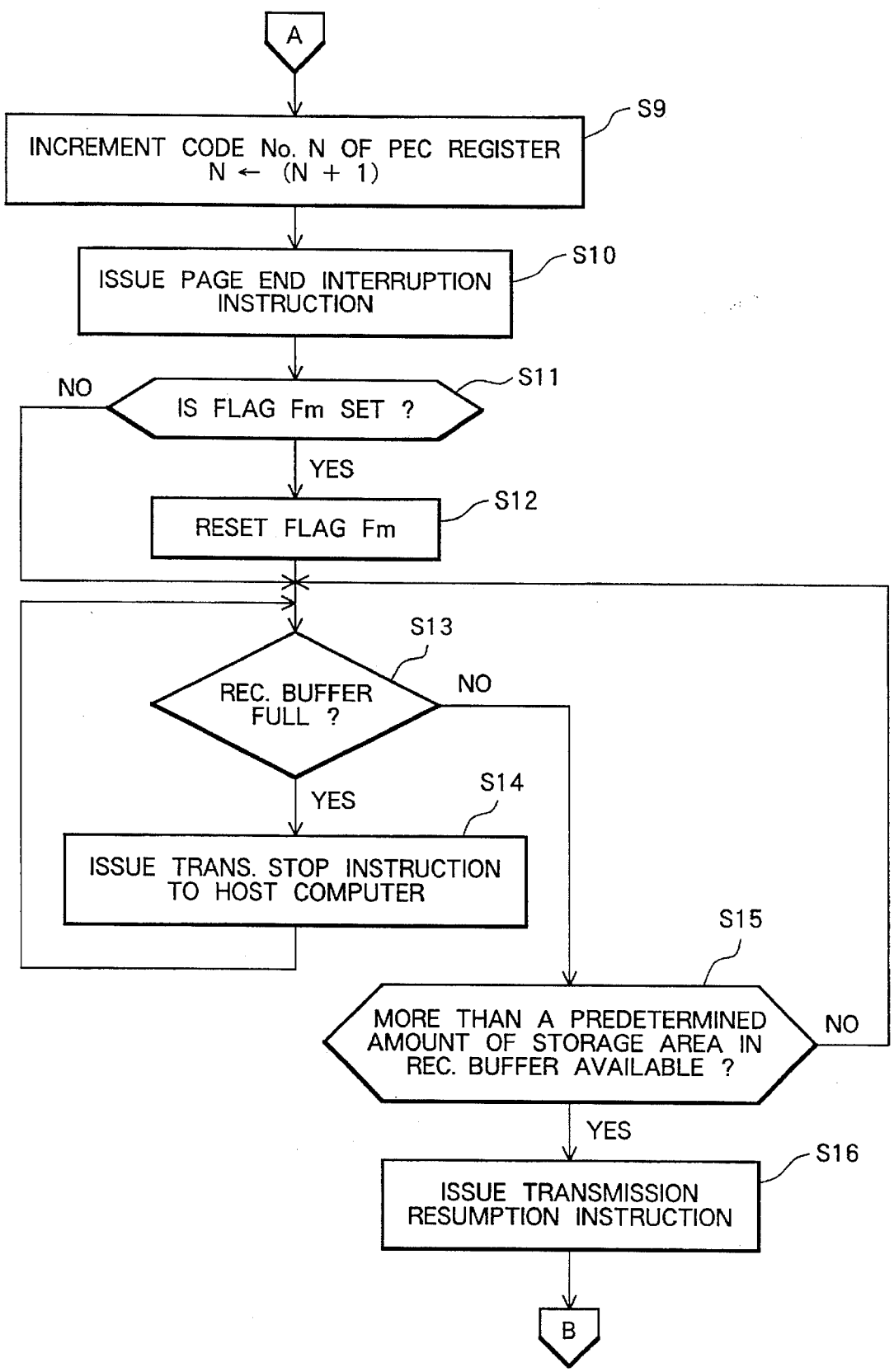
FIG. 4 is a second part of flowchart illustrating a program of the buffer change-over monitor control according to the embodiment of the present invention.

As shown in the flowchart of FIG. 3, the buffer change-over control starts when the printer 1 is powered, whereupon initial settings are performed (S1). In the initial settings, an in-advance print flag Fm (to be described later) stored in a work memory is reset and the code number N of the PEC register is reset to zero (0). Next, whether or not the external RAM 16 is provided is investigated (S2). If the investigation results indicate that the external RAM 16 is provided (S2: YES), a RAM check for the external RAM 16 is executed. Address data of the external RAM 16 obtained as a result of the RAM check is stored in the address register of the RAM 13 and also set to the DMA controller 19, whereupon the routine proceeds to S4.

In S4, the in-advance print mode is set and an in-advance print mode flag is set. The in-advance print mode is set when the external RAM 16 serving as a reception buffer becomes full with the compressed image data before receipt of the page end code PEC in the condition when the printer has not yet started printing. When the external RAM 16 is not provided (S2: NO), the buffer-less print mode is set (S5) and a buffer-less print mode flag is set. Various data needed for carrying out this mode are set to the DMA controller 19. In the buffer-less print mode, printing is carried out without using the reception buffer. The received image data is directly sent to the decoding circuit 17 for decoding and the decoded data is in turn supplied to the line buffer 18 for printing.

When the image data is received from the host computer 4 (S6: YES), the received image data is stored in the reception buffer 16 (S7). The process in S7 is executed by the DMA controller 19. Next, it is determined whether or not the page end code PEC attached to the end of the image data on each page is received (S8). When the page end code PEC is received (S8: YES), the code number N of the PEC register that is provided in the work memory is incremented to (N+1) in S9 of the flowchart shown in FIG. 4. The code number N indicates the code number of the page end code PEC stored in the reception buffer 16. In S10, a page end interruption instruction is issued to the print control being executed by the CPU 10. In response to the page end interruption instruction, printing is started by way of interruption process if printing has not yet been started. If printing has already been started, the image data received before receipt of the page end code PEC and stored in the reception buffer 16 is sent out for printing. Further, discharge of printed paper and supply of fresh paper are performed by way of interruption process.

Next, in S11, it is determined whether the in-advance print flag Fm is set or rest. This flag Fm will be set in S26 as will be described later. If the flag Fm has been set after the start of in-advance printing (S11: YES), the flag Fm is reset so that in-advance printing for the following page can be performed (S12), whereupon the routine proceeds to S13. When the flag Fm is reset (S11: No), the routine skips to S13. In S13, it is determined whether the reception buffer 16 is full or not. In this case, data designated by the block pointer and the address pointer in the DMA controller 18 is read. The reception buffer 16 is determined to be full when the write address catches up with the read address after circulation of the ring buffer ahead of the read address.

When the reception buffer 16 is full (S13: YES), a transmission stop instruction is issued through the transmitter/receiver 15 to the host computer 4 requesting to temporarily stop transmission of the image data, whereupon the routine returns to S13. During interruption of the image data reception in the control unit 3, printing proceeds with the image data stored in the reception buffer 16. Accordingly, empty area in the reception buffer 16 increases with time and so the determination made in S13 is changed to NO. Then, in S15, it is determined whether the empty area in the reception buffer 16 exceeds a predetermined amount (for example, 1 kilo byte). If NO, the routine returns to S13. When the determination made in S15 is changed to YES, a transmission resumption instruction is issued via the transmitter/receiver 15 to the host computer 4 instructing to resume transmission of the image data (S16). Thereafter, the routine returns to S6 and the processes of S6 and on are repeatedly executed.

When the determination made in S8 is NO, a predetermined amount of image data is read out of the reception buffer 16 (S17). Next, it is determined whether or not the data represents the page end code PEC (S18). When the determination made therein indicates YES, the code number N of the PEC register is decremented to (N−1) (S19), and the routine proceeds to S21 shown in the flowchart of FIG. 5. When the determination made in S18 is NO, the retrieved image data is decoded in the decoding circuit 17, and the resultant image data in the form of dot image is stored in the line buffer 18 (S20). Thereafter, the routine proceeds to S21 shown in the flowchart of FIG. 5. The process in S17 is executed by the DMA controller 19, and the process in S20 is executed by the decoding circuit 17.

Figure 5:
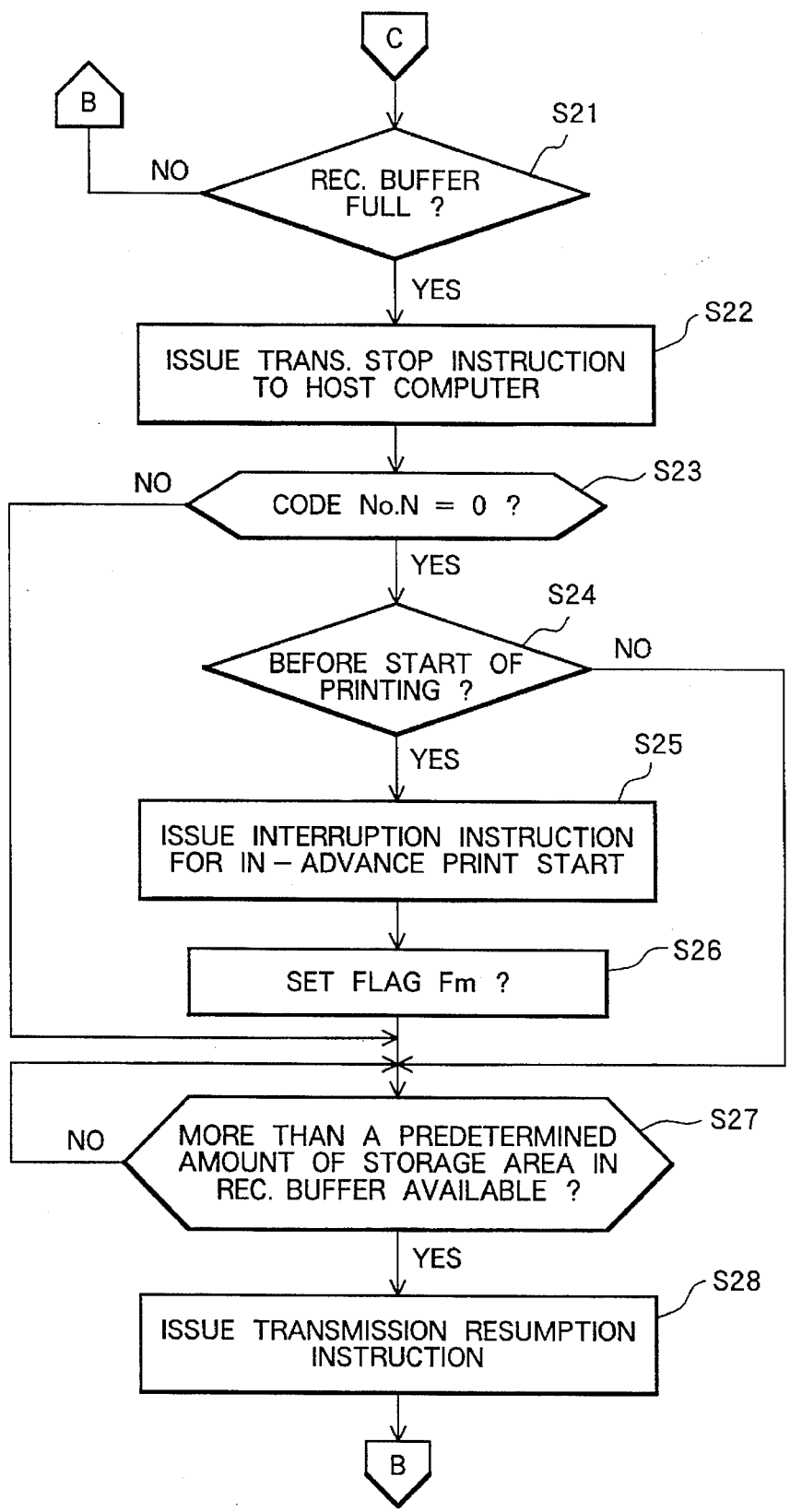
FIG. 5 is a third part of flowchart illustrating a program of a buffer change-over monitor control according to the embodiment of the present invention.

In S21 shown in the flowchart of FIG. 5, it is determined whether or not the reception buffer 16 is full as is done in S13. When the determination made in S21 is NO, the routine returns to S6. When the reception buffer 16 is full, a transmission stop instruction is issued to the host computer 4 as is done in S14 (S22). Next, it is determined whether or not the code number N of the PEC register is 0 (zero), that is, whether or not the page end code is stored in the reception buffer 16 (S23).

When the determination made in S23 is YES, that is, when the page end code PEC is not stored in the reception buffer 16, it is determined whether or not printing has started (S24). If printing has not yet started, the determination made in S24 is YES. Then, the CPU 10 issues an interruption instruction to the print control instructing to start the in-advance print (S25), whereupon the in-advance print flag Fm is set (S26) and then the routine proceeds to S27. In the interruption process responsive to the interruption instruction for starting the in-advance print, the print mechanism is instructed to start printing before receipt of the page end code PEC. When the determination made in S23 is NO, the routine proceeds to S27.

Because printing starts without receiving the image data from the host computer 4, the empty area of the reception buffer 16 increases. In S27, it is determined whether or not the empty area of the reception buffer 16 exceeds the predetermined amount (for example, 1 kilo byte). When the determination made in S27 is NO, this determination is repeatedly carried out. When the empty area of the reception buffer 16 exceeds the predetermined amount, a transmission resumption instruction is issued to the host computer 4 as is done in S16 (S28), and thereafter the routine returns to S6 and the processes of S6 and on are repeatedly executed.

Figure 6:
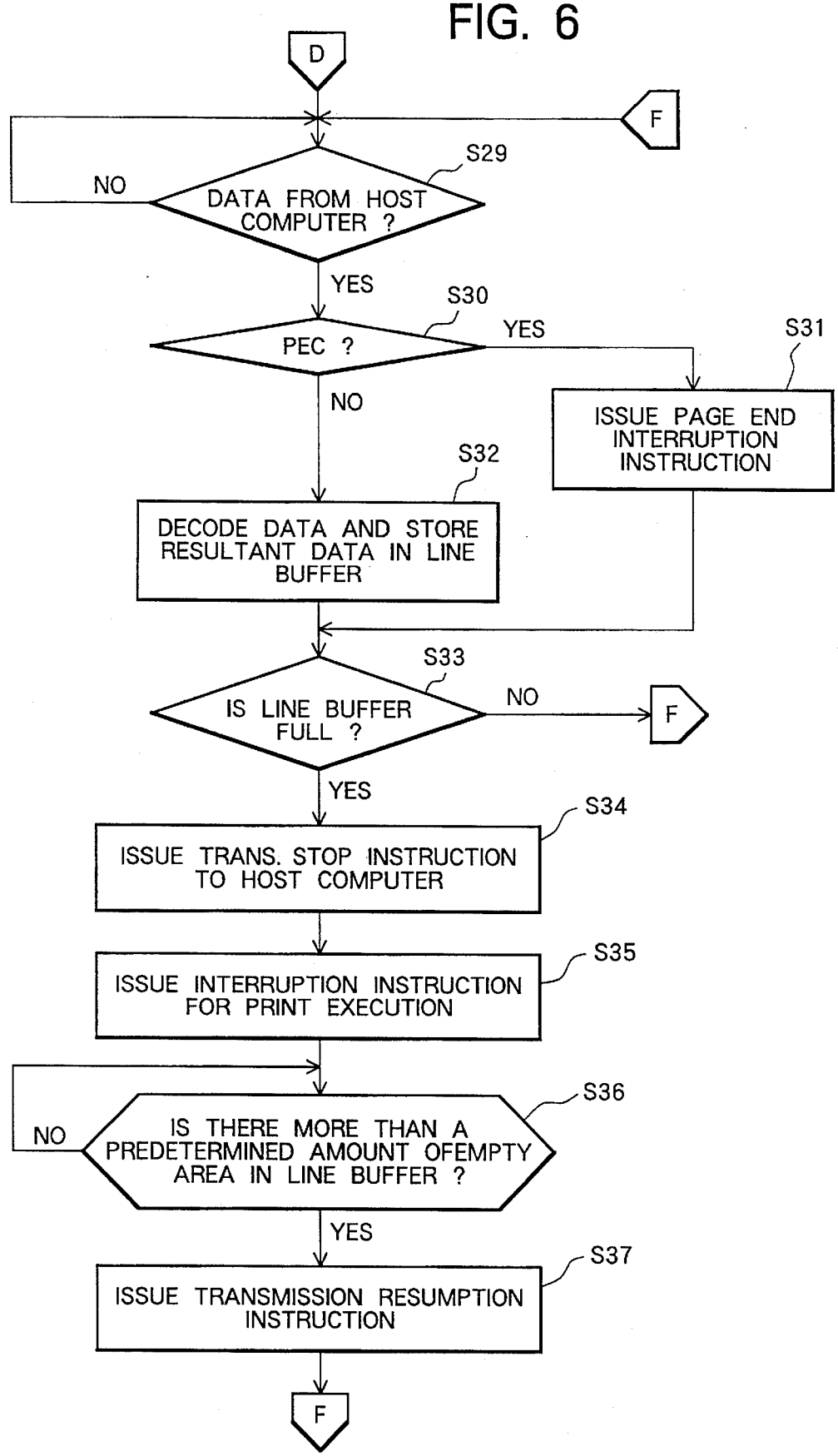
FIG. 6 is a fourth part of flowchart illustrating a program of a buffer change-over monitor control according to the embodiment of the present invention.

When the buffer-less print mode is set in S5, it is determined whether or not the image data is received from the host computer 4 in S29 shown in the flowchart of FIG. 6. When the image data is received therefrom (S29: YES), then it is determined whether or not the received data represents the page end code PEC (S30). If the data represents the page end code PEC (S30: YES), a page end interruption instruction is issued to the print control (S31), and thereafter the routine proceeds to S33. Responsive to the page end interruption instruction, the print mechanism is instructed to start printing if printing has not yet started or to perform discharge of the printed sheet and feed of a fresh sheet with the print mechanism if printing has already been started.

When the determination made in S30 is NO, that is, the received data does not represent the page end code, the received image data is decoded in the decoding circuit 17 and the resultant decoded data is sent to the line buffer 18 for storage therein (S32). Next, it is determined whether or not the line buffer 18 is full (S33). When the determination made in S33 is NO, the routine returns to S29 and the processes in S29 and on are repeatedly executed. If the line buffer 18 is full (S33:YES), the transmission stop instruction is issued (S34) to the host computer 4 as is done in S14, and an interruption instruction for prompting execution of print is issued to the print control (S35). Next, it is determined whether or not the empty area of the line buffer 18 is more than a predetermined amount (for example, 320 byte) (S36). This determination is repeatedly carried out until the affirmative result is obtained. When the determination made in S36 becomes YES, a transmission resumption instruction is issued to the host computer 4 (S37). Thereafter, the routine returns to S29 and the processes in S29 and on are repeatedly executed.

In the above-described embodiment, the external RAM 16 is optionally mounted on the control unit 3, and whether or not the external RAM 16 is mounted thereon is checked. If it is determined that the external RAM 16 serving as a reception buffer is mounted thereon, the image data received from the host computer 4 is stored in the reception buffer 16. The image data retrieved from the reception buffer 16 is decoded in the decoding circuit 17, and the resultant data is sent to the line buffer 18 for printing. On the other hand, when the reception buffer 16 is not mounted thereon, the received image data is decoded in the decoding circuit 17 and the resultant data is sent to the line buffer 18 for printing. Therefore, the host based printer with the reception buffer 16 operates in the same way as in the generally used host based printers. When the cases demand, the reception buffer can be dispensed with, in which case the cost of the host based printer 1 can be reduced.

In the in-advance print mode set when the reception buffer 16 is provided, the interruption instruction is issued to the print control each time when the page end code PEC is received. Therefore, in the interruption process responsive to this interruption instruction, when printing has not yet been started, printing is started and when print has already been started, the paper exchange is carried out.

Further, the code number N of the page end code PEC stored in the reception buffer 16 is counted at all times through the PEC register. Therefore, a first buffer full state in which the reception buffer 16 has become full with the image data containing the page end code PEC and a second buffer full state in which the reception buffer 16 has become full with the image data which does not contain the page end code PEC, can be discriminated.

In the first buffer full state, printing has already been started in accordance with the process in S10, so that no interruption instruction is issued and hence printing is not interrupted by the interruption process but printing is continuously performed. In the second buffer full state as executed in S24 through S26, the interruption instruction is issued to the print control so as to start the in-advance printing only when printing has not yet been started. When printing has already been started, no interruption instruction is issued, so that printing is not interrupted by the interruption process but printing is continuously performed.

In this manner, interruption instructions other than the in-advance print start interruption instruction are not issued and printing is continued in the first or second buffer full state. Accordingly, the print process efficiency is greatly improved.

Even the page end code PEC has not yet been received, the in-advance printing is started in the second buffer full state, so that occurrences of the buffer full errors including print overrun error and transmission error can be prevented.

In addition, when the reception buffer 16 becomes full, the transmission stop instruction is issued to the host computer 4 to temporarily stop transmission of the image data as executed in S14 and S21, therefore, occurrences of the buffer full errors can be prevented. When the empty area of the reception buffer 16 exceeds more than a predetermined amount, the transmission resumption instruction is issued to the host computer 4 to resume transmission of the image data. Therefore, occurrence of the buffer full error can be prevented and the duration in which the transmission of the image data is interrupted can be set to minimum. Because various solutions are prepared for the cases where the reception buffer 16 becomes full, the reception buffer 16 can be of a small-size and small storage capacity.

In the buffer-less print mode set when the reception buffer 16 is not provided, the transmission stop instruction is issued to the host computer 4 to temporarily stop transmission of the image data when the line buffer 18 becomes full. Therefore, occurrence of the data transmission error can be prevented. When the line buffer 18 becomes full, execution of printing is prompted by the print .execution interruption instruction as is done in S35. Therefore, the full state of the line buffer 18 can be immediately resolved. When the empty area of the line buffer 18 exceeds more than the predetermined amount after issuance of the transmission stop instruction, the transmission resumption instruction is issued. Accordingly, the transmission of the image data can be immediately resumed.

Figure 7:
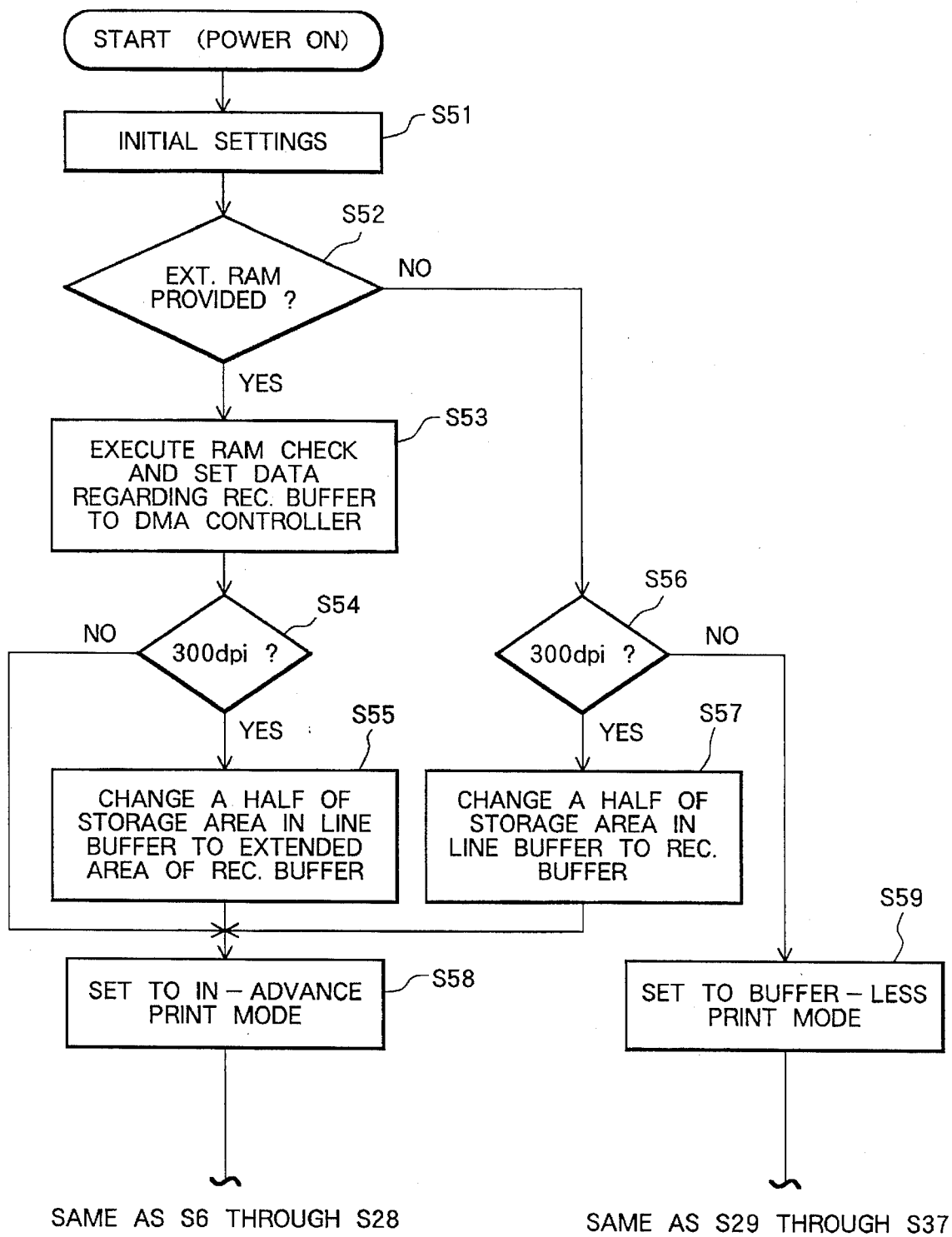
FIG. 7 is a part of flowchart illustrating a program of a buffer change-over monitor control according to another embodiment of the present invention.

Another embodiment of the print mode setting control will be described while referring to the flowchart shown in FIG. 7.

The control starts when the printer 1 is powered, whereupon initial settings are performed (S51). Then, it is determined whether or not the external RAM 16 is provided (S52). When the determination in S52 is YES, a RAM check of the external RAM 16 is implemented, and address data regarding the reception buffer 16 is stored in the address register and set to the DMA controller 19 (S53). Next, it is determined whether or not the print resolution is set to 300 dpi based on the signal from the resolution setting switch 5a provided on the operation panel 5 (S54).

When the resolution is set to 600 dip (S54: NO), the routine proceeds to S58. When the resolution is set to 300 dip (S54: YES), a half of the storage area in the line buffer 18, i.e., 320 byte, is changed to an extended area of the reception buffer 16 in S55. Thereafter, the routine proceeds to S58. When the half of the storage area in the line buffer 18 is changed to the extended area of the reception buffer 16, the various data in the address register of the RAM 13 are modified while referring to the extended area, and the modified data are set to the DMA controller 19.

On the other hand, the determination in S52 indicates that the external RAM 16 is not provided, it is determined whether or not the resolution is set to 300 dpi (S56). When the determination in S56 indicates that the resolution is set to 300 dip (S56: YES), the half of the storage area in the line buffer 18 is changed to one block of the reception buffer in S57. Thereafter, the routine proceeds to S58. When a half of the storage area of the line buffer 18 is changed to the extended area of the reception buffer 16, the number of blocks of the reception buffer changed from the line buffer 18, leading address, and trailing address and the like are stored in the address register of the RAM 13 and are also set to the DMA controller 19.

In S58, the in-advance print mode is set, and thereafter the processes same as S6 to S28 are executed. When the determination made in S56 is NO and thus the resolution is set to 600 dpi, the buffer-less print mode is set in S59 and various kinds of data needed for the bufferless print mode are set to the DMA controller 19. Thereafter, the processes same as S29 to S37 are executed.

Because the line buffer 18 has a minimum storage capacity (for example, 640 byte) needed for storing data when the resolution is set to 600 dpi, all the storage area of the line buffer 18 must be used as a line buffer when the resolution is 600 dpi. However, when the resolution is set to 300 dpi, a half of the storage area of the line buffer 18 is used as the line buffer but the rest of the storage area (320 byte) is remained unused in the conventional printers. In the present invention, the empty area of the line buffer 18 is effectively used as an extended area of the reception buffer.

More specifically, when the external RAM 16 is provided, the unused storage area of the line buffer 18 is switched to the extended area of the reception buffer 16. When the external RAM 16 is not provided, the rest of the storage area of the line buffer 18 is switched to the reception buffer. In this manner, the line buffer 18 is effectively used so as to extend the storage area of the reception buffer 16 or to provide the reception buffer. Accordingly, the reception of the image data can be smoothly performed and occurrences of errors caused by a buffer full condition can be reduced.

While exemplary embodiments of this invention have been described in detail, those skilled in the art will recognize that there are many possible modifications and variations which may be made in these exemplary embodiments while yet retaining many of the novel features and advantages of the invention. For example, although in S13 and S21, it is determined whether or not the reception buffer 16 is full, the determination that the reception buffer 16 has become full may be made when the residual amount of storage area in the reception buffer 16 is less than a predetermined amount that is set in view of the transmission speed of the image data. Because in the described embodiment, a small amount of image data may be transmitted during a brief period of time from the time when the reception buffer 16 has become full until the time when the transmission of the image data is stopped responsive to the transmission stop instruction. Further, the resolutions of 600 dpi and 300 dpi are exemplified in the above embodiments, but the print density can be set to another values. The storage capacity of the line buffer 18 may be set in association with the resolution.

What is claimed is:

1. A host based printer for use in combination with a host computer, comprising:
   a reception buffer for receiving compressed image data from said host computer;
   a decoding circuit for decoding the compressed image data retrieved from said reception buffer and providing dot image data;
   a line buffer having a storage area for storing the dot image data and outputting the dot image data;
   printing means for printing dot images on a sheet of paper in accordance with the dot image data output from said line buffer, the dot images having a resolution defined by a printable dot number per a unit length;
   resolution selecting means for selecting one from at least a first resolution and a second resolution lower than the first resolution;
   print control means for controlling said print means to print the dot images with either the first resolution or the second resolution selected by said resolution selecting means; and
   buffer switching means for switching a part of the storage area of said line buffer to an extended storage area of said reception buffer when said resolution selecting means selects the second resolution.

2. A host based printer according to claim 1, further comprising page end code detecting means for detecting a page end code contained in the compressed image data received at said reception buffer, the page end code representing an end of the compressed image data on each page.

3. A host based printer according to claim 2, wherein when said page end code detecting means detects the page end code, said print control means controls said print means to start printing the dot images, if printing has not yet been started.

4. A host based printer according to claim 3, wherein said printing means includes a sheet feeding mechanism for performing a sheet feed operation including a discharge of a printed sheet of paper and feeding of a fresh sheet of paper, and wherein when said page end code detecting means detects the page end code, said print control means controls said sheet feeding mechanism to perform the sheet feed operation, if printing has already been started at the time of detection of the page end code.

5. A host based printer according to claim 2, wherein said print control means controls said print means to start printing when said reception buffer has become full with the compressed image data before said page end detecting means detects the page end code.

6. A host based printer according to claim 3, further comprising:
   first determining means for determining whether or not said reception buffer is full with the compressed image data;
   first instructing means for instructing said host computer to stop transmitting the compressed image data when said first determining means determines that said reception buffer is full;
   second determining means for determining whether or not more than a predetermined amount of storage area in said reception buffer is available; and
   second instructing means for instructing said host computer to resume transmission of the compressed image data when said second determining means determines that the predetermined amount of storage area in said reception buffer is available.

7. A host based printer according to claim 6, further comprising third determining means for determining whether or not said reception buffer stores the page end code, and wherein said print control means controls said printing means to start printing when said third determining means determines that said reception buffer does not store the page end code.

8. A host based printer for use in combination with a host computer, comprising:
   a decoding circuit for directly receiving compressed image data from said host computer, decoding the compressed image data, and providing dot image data;
   a line buffer having a storage area for storing the dot image data and outputting the dot image data;
   printing means for printing dot images on a sheet of paper in accordance with the dot image data output from said line buffer, the dot images having a resolution defined by a printable dot number per a unit length;
   resolution selecting means for selecting one from at least a first resolution and a second resolution lower than the first resolution;
   print control means for controlling said print means to print the dot images with either the first resolution or the second resolution selected by said resolution selecting means; and
   switching means for switching a compressed image data receiving location from said decoding means to said line buffer when said resolution selecting means selects the second resolution wherein a part of the storage area of said line buffer is used as a storage area for receiving the compressed image data.

9. A host based printer according to claim 8, further comprising page end code detecting means for detecting a page end code contained in the compressed image data received at said decoding circuit, the page end code representing an end of the compressed image data on each page.

10. A host based printer according to claim 9, wherein when said page end code detecting means detects the page end code, said print control means controls said print means to start printing the dot images, if printing has not yet been started.

11. A host based printer according to claim 10, wherein said printing means includes a sheet feeding mechanism for performing a sheet feed operation including a discharge of a printed sheet of paper and feeding of a fresh sheet of paper, and wherein when said page end code detecting means detects the page end code, said print control means controls said sheet feeding mechanism to perform the sheet feed operation, if printing has already been started at the time of detection of the page end code.

* * * * *